United States Patent
Mocquard et al.

(10) Patent No.: US 7,398,062 B2
(45) Date of Patent: Jul. 8, 2008

(54) TRANSMISSION SYSTEM WITH HIGH FREQUENCY STABILITY

(75) Inventors: Olivier Mocquard, Rennes (FR); Jean-Yves Le Naour, Pace (FR)

(73) Assignee: Thomson Licensing, Boulogne-Billancourt (FR)

( * ) Notice: Subject to any disclaimer, the term of this patent is extended or adjusted under 35 U.S.C. 154(b) by 264 days.

(21) Appl. No.: 10/464,157

(22) Filed: Jun. 18, 2003

(65) Prior Publication Data

US 2003/0232604 A1 Dec. 18, 2003

(30) Foreign Application Priority Data

Jun. 18, 2002 (FR) .................................. 02 07685

(51) Int. Cl.
*H04B 1/02* (2006.01)
(52) U.S. Cl. ........................................................ 455/92
(58) Field of Classification Search ................. 455/92
See application file for complete search history.

(56) References Cited

U.S. PATENT DOCUMENTS

| 4,592,093 | A | 5/1986 | Ouchi et al. |
| 5,212,554 | A * | 5/1993 | Tults ........................... 348/735 |
| 5,574,997 | A | 11/1996 | Hong |
| 5,692,016 | A * | 11/1997 | Vanselow ..................... 375/344 |
| 5,844,939 | A * | 12/1998 | Scherer et al. ............... 375/219 |
| 6,177,964 | B1 * | 1/2001 | Birleson et al. ............. 348/725 |
| 6,243,577 | B1 | 6/2001 | Elrefaie et al. |
| 6,625,222 | B1 * | 9/2003 | Bertonis et al. ............. 375/259 |
| 6,999,716 | B1 * | 2/2006 | Andre et al. ................ 455/3.02 |

FOREIGN PATENT DOCUMENTS

| EP | 1162740 A1 * | 12/2001 |
| WO | WO 02/33855 | 4/2002 |

* cited by examiner

*Primary Examiner*—Duc Nguyen
*Assistant Examiner*—Eric Elcenko
(74) *Attorney, Agent, or Firm*—Joseph J. Laks; Robert D. Shedd; Brian J. Cromarty

(57) ABSTRACT

The invention proposes a transmission system using a reference subcarrier to synchronize a local oscillator 104. The reference subcarrier can be placed at various locations of the band allotted to an operator. The external unit 1 of the reception device comprises frequency-wise selection means 107 which make it possible to select the synchronization subcarrier.

8 Claims, 4 Drawing Sheets

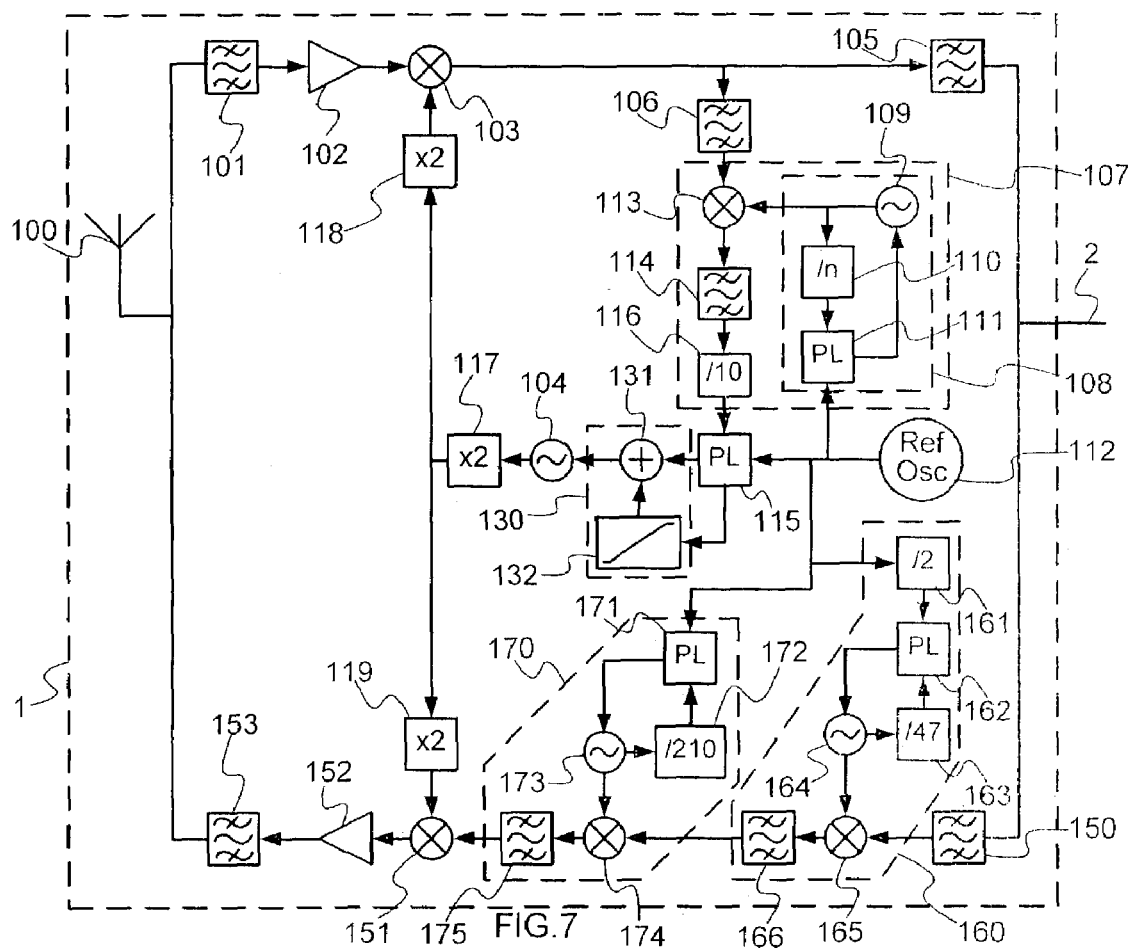
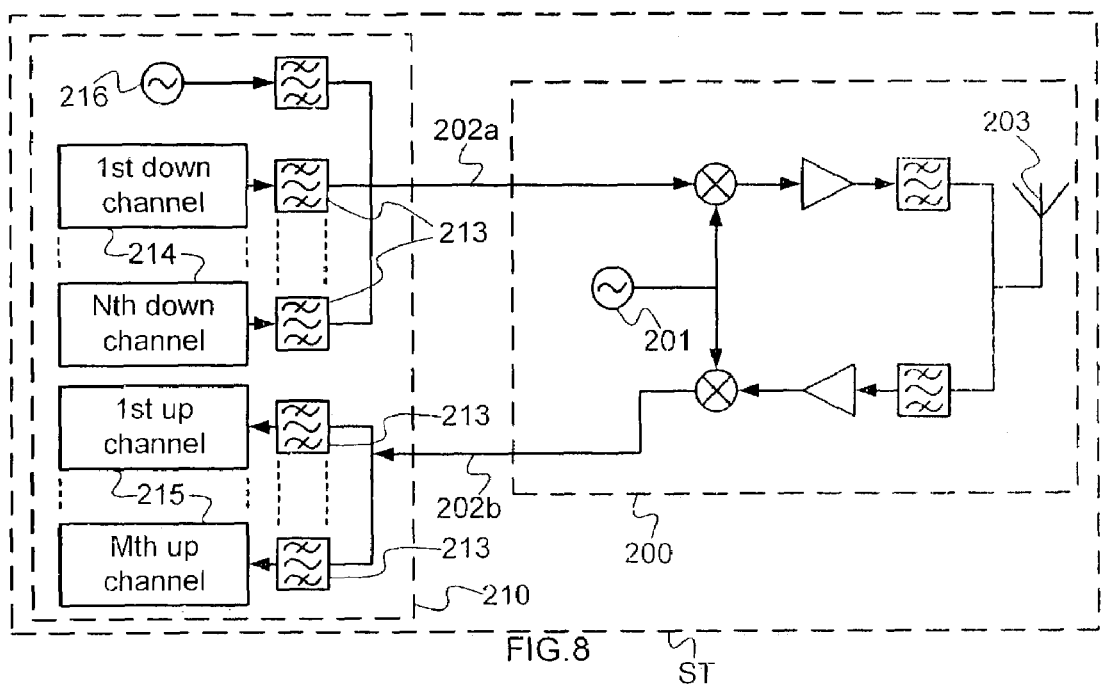
FIG.7
FIG.8

TRANSMISSION SYSTEM WITH HIGH FREQUENCY STABILITY

FIELD OF THE INVENTION

The invention pertains to a transmission system with high frequency stability. More particularly, the invention concerns an external unit placed on a subscriber side.

BACKGROUND OF THE INVENTION

Radio transmission systems of point-multipoint type are known to the person skilled in the art by the initials MMDS (standing for Microwave Multipoint Distribution System), LMDS (standing for Local Multipoint Distribution System) and MVDS (standing for Multipoint Video Distribution System). These systems used for the broadcasting of programmes permit a return link for the subscriber terminals which allows the subscriber to interact with the programme received.

In Europe, provision has been made to implement a system of LMDS type which has 24 broadcasting channels (also referred to as downlinks) having a bandwidth of 33 MHz, and 25 return channels (or uplinks) having a bandwidth of 2 MHz, these channels being situated between 40.5 and 42.5 GHz (for further details on the apportioning of the channels, the person skilled in the art may consult the MPT-1560-RA standard). The system implemented must comply with the ETSI standard 301199 better known as DVB LMDS which among other things makes provision for an oscillator drift of plus or minus 200 kHz for the uplink, the drift being due mainly to climatic conditions. For further information about the systems, the person skilled in the art may refer for example to the patent application WO 2002/33855.

The bandwidth allotted for this type of application has been increased and currently corresponds to a frequency band lying between 40.5 and 45.5 GHz. Provision is also made to segment this band so as to apportion it among several operators.

FIG. 1 illustrates an exemplary distribution network for an operator deploying systems of this type. Base stations ST are deployed over a given zone. A base station ST covers one to four sectors A, B, C and D of finite size. Each sector uses a different frequency band and/or polarization so as to reduce the problems of interference between adjacent sectors.

FIG. 2 shows a configuration where a first operator has deployed three base stations ST and where a second operator has deployed his own base station ST'. A more considerable deployment of the two operators does not pose any problem of interference insofar as the frequencies allotted to the operators are completely different.

Such systems compete with other distribution networks such as satellite, cable or telephone. However, these systems may be used by a cable operator who wishes to extend his network without having to fully cable a given zone. For this purpose, operators desire that the decoders placed at subscribers premises be the same as for cable so as to avoid development overhead costs. Furthermore, it is desired that this type of network be able to serve as wireless bridge for a cable network.

FIG. 3 illustrates a distribution network system serving as relay for a cable network. A base station ST furnished with a transmitter, and possibly with a receiver, broadcasts information destined for a plurality of subscribers. On the subscriber side, an external unit 1 is connected to a cable network 2. A subscriber can connect up to the cable network 2 with the aid of an internal unit 3 which serves as interface to one or more user appliances 4. The external unit comprises an antenna and means for transposing the signals received into a frequency band compatible with the cable network 2 and means for transposing signals to be transmitted to the base station ST. The internal unit 3 is for example a TV decoder or a modem intended for the cable network 2. The user appliance 5 is for example a television, a telephone or a computer.

The production of an external unit requires compliance with transmission conditions related on the one hand to the radio path and on the other hand to the cable path. The DOCSIS standard which relates to cable networks permits a frequency drift of 32 kHz for the uplink and 30 kHz for the downlink. If this frequency drift is taken back to the radio frequency used, it is noted that the stability of the oscillators situated in the external unit 1 must be less than 1 in 1 million. But the external unit 1 is subjected to temperature and climate constraints which make it difficult and hence very expensive to achieve such stability.

A known solution consists in using a reference subcarrier sent by the base station so as to synchronize the external unit. Such a solution is described for example in U.S. Pat. No. 5,844,939. FIG. 4 represents a circuit corresponding to the type of circuit disclosed by the said patent. The signals received are transposed by a mixer 5. From among the signals transposed, a filter 6 selects a portion of band in which only the reference subcarrier should be situated. A phase/frequency comparator 7 compares the filtered frequency with a reference oscillator 8 and operates an oscillator 9 which provides the transposition frequency to the mixer 5. The frequency feedback control thus carried out corresponds to a phase-locked loop which makes it possible to achieve an absolute error in the frequency of the oscillator 9 which is equal to the error in the reference oscillator 8. Additionally, this technique compensates furthermore for the frequency drift of the base station. Moreover, if a return link uses one and the same oscillator to transpose the uplink and downlink, the error in the return link is also compensated.

Such a system may not be used in a cellular distribution network corresponding to FIGS. 1 and 2. The use of a fixed frequency for the entire distribution network would cause interference between the zones using one and the same frequency.

SUMMARY OF THE INVENTION

The invention proposes a transmission system in which the position of the synchronization subcarrier can be placed at various locations of the band allotted to an operator. The external unit of the reception device comprises additional transposition means which make it possible to reduce the synchronization subcarrier down to a predefined frequency span independently of its position in the transmission frequency band.

The invention is an external unit placed on the subscriber side of a transmission system using at least one reference subcarrier placed in a transmission frequency band, the transmission frequency band furthermore comprising at least one data-carrier downlink channel. The external unit comprises a local oscillator for transposing the transmission frequency band into a transposed frequency band, the transposed frequency band including the transposed reference subcarrier, synchronization means for synchronizing the local oscillator with the aid of the reference subcarrier. The synchronization means comprise selection means which transpose the transposed reference subcarrier into a desired synchronization frequency span.

Preferably, the selection means comprise a means for producing a signal at a programmable frequency.

In an application with low phase noise using very selective filtering, the unit comprises a latching device placed between the local oscillator and the synchronization means so that the latching device drives the local oscillator until a transposed image of the reference subcarrier appears in the desired synchronization frequency span.

To minimize the frequency error of a return link, the unit comprising uplink means for transposing and amplifying a return frequency band which includes at least one uplink channel from a low frequency band to a return link transmission bard, and the said uplink means carry out a first frequency transposition with the local oscillator.

In order to minimize constraints relating to filtering and frequency error of the return link, the uplink means carry out a second frequency transposition, and the first and second transpositions are done in an infradyne manner in the one case and in a supradyne manner in the other case.

The invention is also a radio frequency transmission system comprising at least one base station and at least one subscriber device, the base station using a single oscillator to perform a downward transposition of signals towards the frequency band transmitted by radio and possibly an upward transposition of signals from the frequency band received by radio, the subscriber device comprising an internal unit as defined above and an external unit which are linked by a cable

BRIEF DESCRIPTION OF THE DRAWINGS

The invention will be better understood, and other features and advantages will become apparent on reading the description which follows, the description making reference to the appended drawings among which:

FIGS. 5 to 7 represent various implementations of the invention, and FIG. 8 represents an exemplary base station used according to the invention.

DETAILED DESCRIPTION OF PREFERRED EMBODIMENTS

In the present document, the labels in the figures using one and the same set of initials are used for identical or similar elements.

Figure 1:
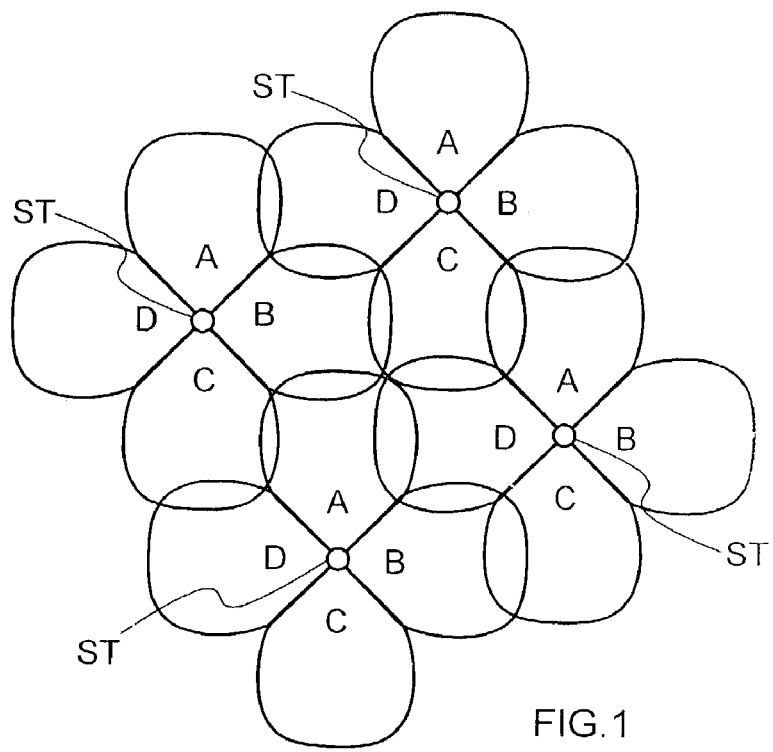
FIGS. 1 and 2 represent networks of transmission cells using the invention.
Figure 2:
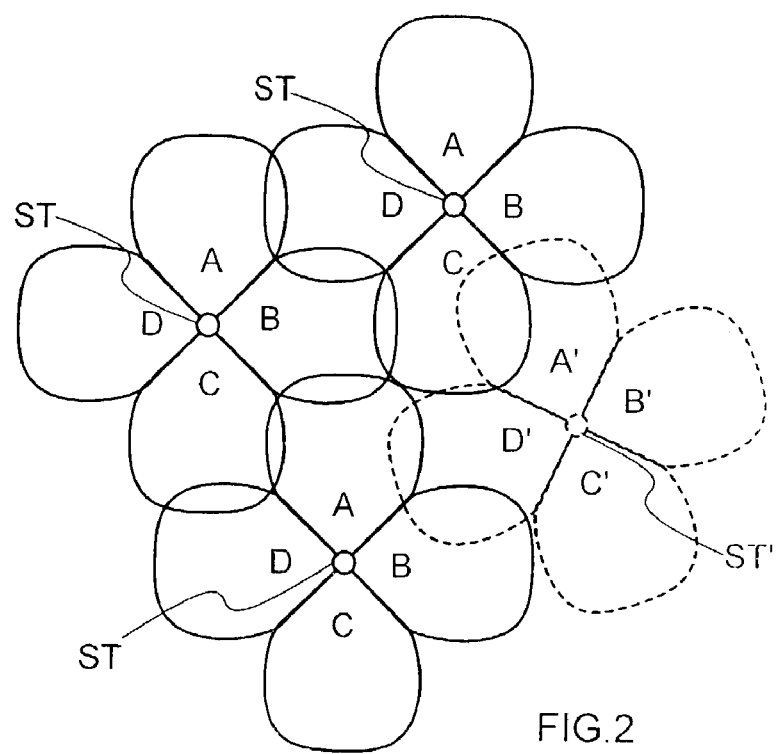
Figure 3:
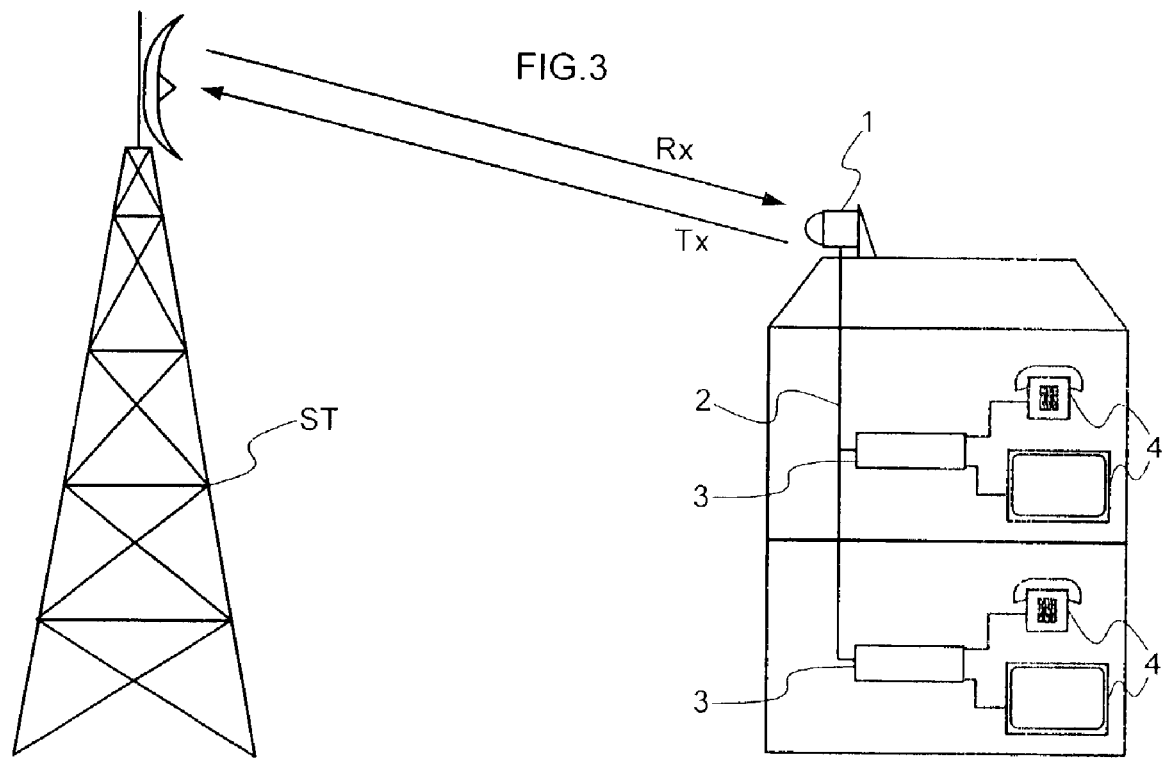
FIG. 3 represents a distribution network using the invention.
Figure 4:
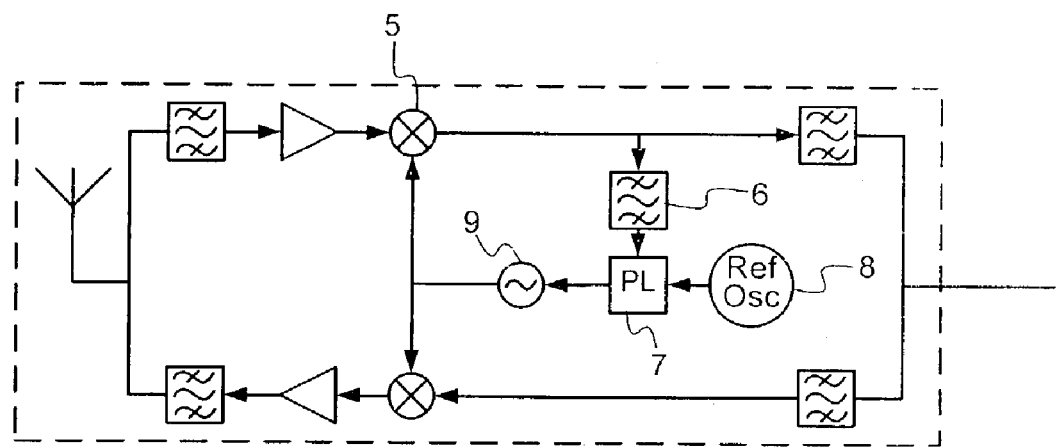
FIG. 4 represents an exemplary device synchronized on a subcarrier according to the state of the art.
Figure 5:
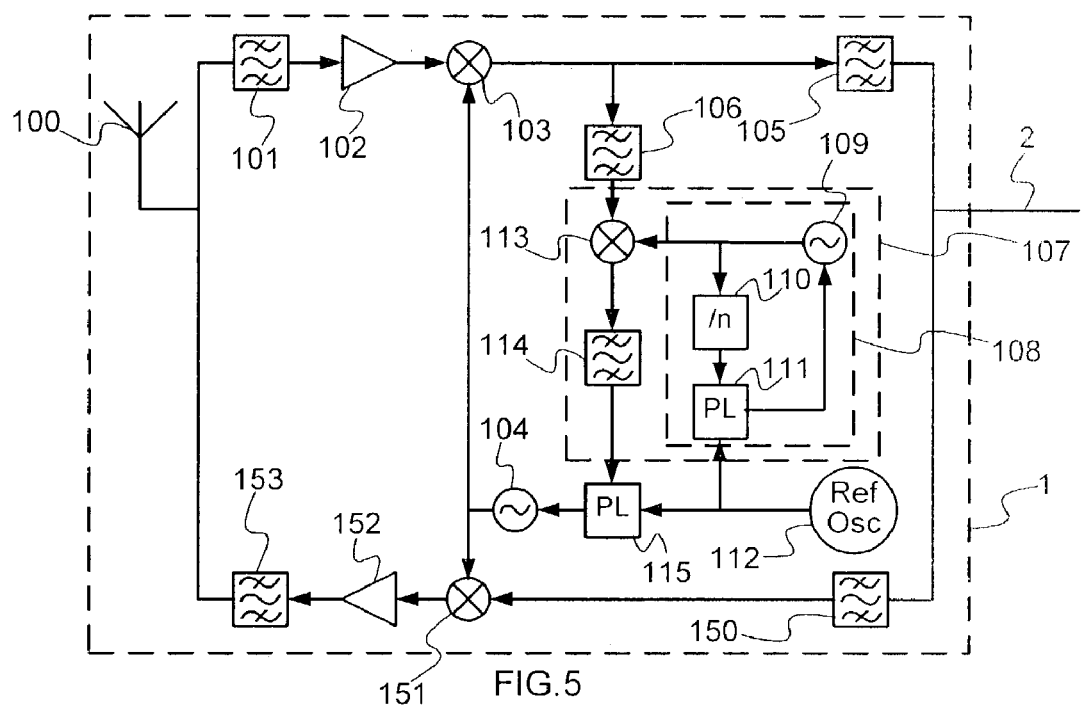

FIG. 5 represents a first embodiment of an external unit according to the invention. An antenna 100 serves to receive the signals originating from the base station and to transmit signals to this same base station. The transmission band consists of two disjoint frequency planes, one for the down signals and the other for the up signals. By way of example, the down signals lie between 40.5 and 41 GHz and the up signals lie between 41.5 and 41.6 GHz.

For the downlink, a bandpass filter 101 linked to the antenna selects the useful band for example the 40.5 to 41 GHz band. An amplifier 102 amplifies the signals leaving the filter 101. A mixer 103 mixes the signals originating from the amplifier 102 with a signal at a transposition frequency originating from an oscillator 104. The oscillator 104 is for example a Dielectric Resonator Oscillator having a voltage control for adjustment. The frequency of the oscillator is for example 41.35 GHz, so that the transposed useful band lies between 350 and 850 MHz. A bandpass filter 105 allowing through the signals lying between 350 and 850 MHz links the output of the mixer 103 to the cable 2 which handles the distribution to one or more internal units 3 placed in the subscriber housings.

To be able to adjust the frequency of the oscillator 104, a pilot signal is inserted into the useful band and transmitted by the base station. The pilot signal is for example a subcarrier of frequency 40.5 GHz which is transposed to 850 MHz. A filter 106, for example identical to the filter 105, isolates the transposed pilot signal for a selection device 107. A frequency synthesizer 108 provides a frequency transposition signal for example equal to 750 MHz. The synthesizer 108 is produced with the aid of a phase-locked loop according to a known technique and it is for example composed of a VCO 109, of a frequency divider 110 and of a phase/frequency comparator 111 which is coupled to a reference oscillator 112. A mixer 113 mixes the signals from the filter 106 with the signal originating from the synthesizer 108 so as to reduce the pilot to a frequency of around 100 MHz. A bandpass filter 114 centred on 100 MHz selects the pilot signal from among the signals leaving the mixer 113. A phase/frequency comparator 115 compares the pilot signal originating from the filter 114 with a reference signal originating from a reference oscillator 112 which is for example the same reference oscillator 112 as that of the synthesizer 108. The phase/frequency comparator 115 operates the oscillator 104 and carries out the frequency feedback control of the oscillator 104 so that the pilot signal is set at the input of the phase/frequency comparator 115 to the same frequency. The assembly of elements carrying out the frequency feedback control constitutes a phase-locked loop which includes the mixer 103, the filter 106, the selection device 107, the phase/frequency comparator 115 and the oscillator 104.

The error of such a device is calculated by summing the error of the reference oscillator 112 with that of the synthesizer 108. If the reference oscillator 112 provides a signal at 100 MHz with an accuracy of $10^{-5}$, the maximum frequency error in the pilot signal at the output of the filter 114 is 1 kHz. Additionally, the frequency synthesizer has the same accuracy as the reference oscillator, namely $10^{-5}$, but for 750 MHz, this represents a maximum error of 7.5 kHz. The total error turns out to be 8.5 kHz for transposition to 41.35 GHz, i.e. around $2.1\ 10^{-7}$ for this example.

As indicated above, the benefit of this system is that it is possible to have a different pilot signal depending on the geographical zone and without changing hardware. To use a pilot signal set to 40.7 GHz, it is sufficient to change the frequency of the synthesizer 108 and to provide a transposition signal at a frequency of 550 MHz. As compared with the previous example, the error then turns out to be 6.5 kHz for 40.2 GHz, i.e. around $1.6\ 10^{-7}$. The person skilled in the art may note that the frequency transposition carried out with the aid of the mixer 113 has the effect of aliasing the spectrum and may superimpose a channel with the pilot signal. The effect produced is an addition of noise to the pilot signal and may cause phase noise in the oscillator 104, which will be of interest subsequently.

As far as the changing of frequency of the synthesizer 108 is concerned, several solutions are possible. During installation, an operator stores the frequency to be used. Such storage may be done by programming a nonvolatile memory situated in the external unit or by setting on/off switches.

The external unit 1 also comprises an uplink. The signals present on the cable 2 pass through a filter 150 which allows through a frequency band, for example lying between 150 and 250 MHz, corresponding to the uplink channels. A mixer 151 transposes the uplink channels into the 41.5 to 41.6 GHz span with the aid of the oscillator 104. An amplifier 152 and a filter 153 linked to the antenna 100 carry out the amplification and the transmission of the uplink channels.

The transposition error on the uplink is the same as with regard to the downlink. However, this error relates to the signal transmitted via the downlink. In order for the error to be the same, the same oscillator should be used in the base station to transpose the up signal and the down signal.

As indicated previously, the superposition of a channel with the pilot signal adds noise to the pilot signal and causes phase noise at the oscillator 104 level. To minimize this drawback, it is sufficient to use a very selective filter 114, the selectivity of the filter greatly reducing noise. However, if the passband of the filter 114 is very greatly reduced, the noise becomes negligible but the pilot signal may be outside the passband of the filter 114 and the phase-locked loop carrying out the frequency feedback control does not lock, giving rise to a malfunctioning of the system.

Figure 6:
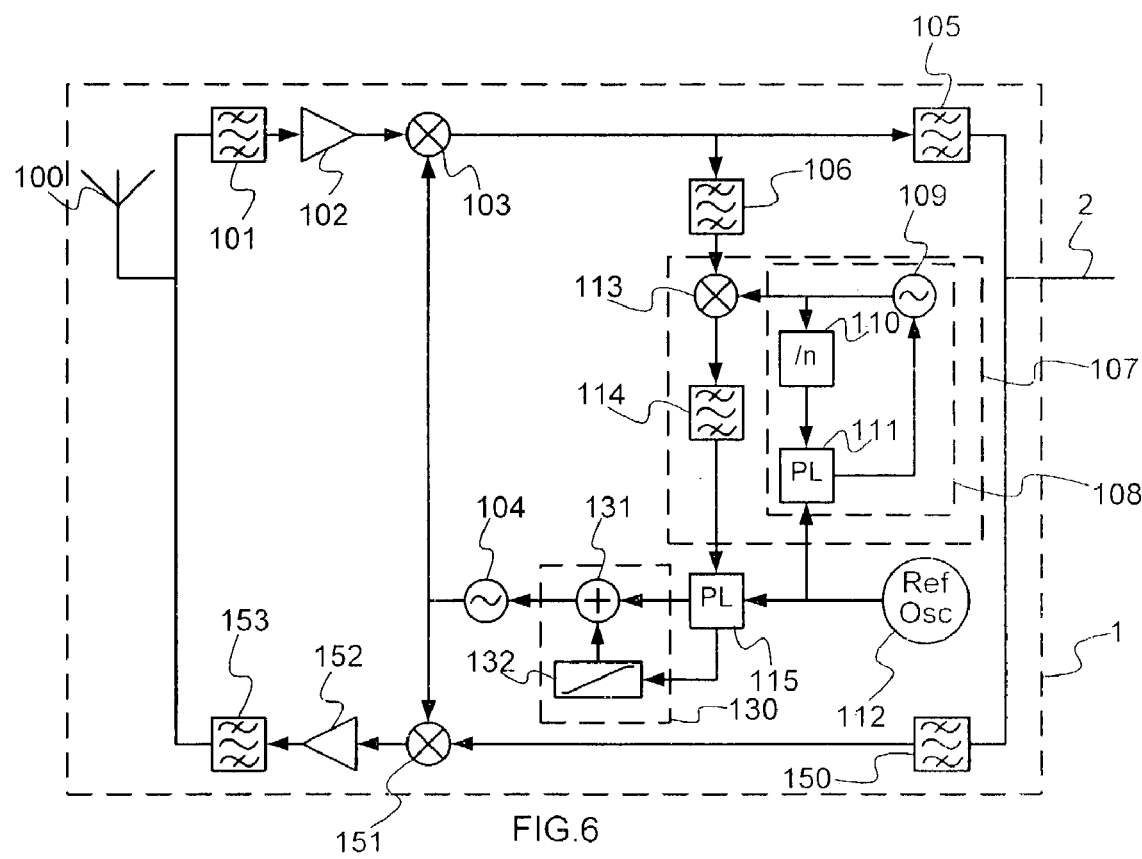

To remedy this problem of latching on system start up, a latch device 130 has been added in the diagram of FIG. 6. An adder circuit 131 adds a signal originating from a ramp generator 132 to the signal leaving the phase/frequency comparator 115. The ramp generator provides a variable voltage as long as the phase-locked loop is not locked. When the phase-locked loop is locked, the phase/frequency comparator 115 sends a signal to the ramp generator 132 so that the latter maintains its output voltage at a constant level. The feedback control is then achieved by way of the phase-locked loop. For this purpose, the phase/frequency comparator 115 should provide an output voltage span destined for the oscillator 104 which is less than the voltage span provided by the ramp generator 132.

Thus, when the external unit is brought into service, the phase-locked loop is not latched. The oscillator 104 provides a signal whose frequency corresponds to an extreme frequency, for example its minimum frequency. The ramp generator 132 provides a signal which alters gently between a minimum voltage and a maximum voltage so as to make the frequency of the oscillator 104 go progressively to the other extreme frequency of the oscillator 104, for example its maximum frequency. In the course of this frequency variation, the pilot signal will be located for at least an instant in the passband of the filter 114 and the phase-locked loop will lock onto this pilot signal. The phase/frequency comparator 115 stops the excursion carried out by the ramp generator 132 and takes over with regard to the feedback control.

If, while functioning, the phase-locked loop were to lose the pilot signal, the ramp generator 132 would continue the excursion until reaching a maximum voltage and would then start again from the minimum voltage until a new latching of the phase-locked loop as indicated above.

To produce complete compatibility with the DOCSIS standard, there should be an uplink lying between 5 and 65 MHz on the cable 2. Direct transposition to frequencies of the order of 40 GHz requires very efficient filtering to reject a transposition image situated at 10 MHz of the useful band. To remedy this problem, it is known to use one or more inter-mediate transpositions. The diagram of FIG. 7 shows an external unit 1 according to the invention for which the various values indicated for the oscillators and filters are chosen so as to partially compensate for the errors of the various transpositions on the uplink.

The modifications of the elements described above relate essentially to the numerical values. A frequency divider 116 is placed between the filter 114 and the phase/frequency comparator 115 so as to have an oscillator 112 frequency of 10 MHz which is easier to implement. Since the frequency divider 116 divides the frequency by 10, the passband of the filter 114 remains centred on the frequency of 100 MHz. For cost reasons, it is preferable to use an oscillator 104 of lower frequency than the transposition frequency. For this purpose, frequency doublers 117, 118 and 119 are placed between the oscillator 104 and the mixers 103 and 151, thus enabling the frequency of the oscillator 104 to be divided by 4.

The transmission frequency band used for the down signals lies between 40.5 and 41 GHz, this corresponding to the passband of the filter 101. The transposition is made at a frequency of 40.2 GHz, the oscillator 104 providing a signal at a nominal frequency of 10.05 GHz which can be adjusted electrically to ±0.1%. The passband of the filters 105 and 106 corresponds to the transposed useful band lying between 300 and 800 MHz (the DOCSIS standard imposes a band lying between 91 and 857 MHz). The frequency synthesizer 108 makes it possible to generate for example frequencies lying between 200 and 700 MHz with a step size of 10 MHz.

The downlink operates in the same manner as described above. The frequency error lies between 3 and 8 kHz depending on the position of the pilot signal, i.e. an error of beween $7.5 \cdot 10^{-8}$ and $2 \cdot 10^{-7}$.

As far as the uplink is concerned, two transposition devices 160 and 170 have been added so as to reduce the filtering constraints. The uplink undergoes three frequency transpositions. Advantageously, transpositions are carried out in an infradyne and in a supradyne manner so as to partly compensate for the errors in the transposition frequencies. The terms infradyne and supradyne refer in this document to the signal resulting from the transposition. When a transposition is performed in an infradyne manner, this signifies that the frequency of the local oscillator is less than the useful signal resulting from the transposition. When a transposition is performed in a supradyne manner, this signifies that the frequency of the local oscillator is greater than the useful signal resulting from the transposition.

The filter 150 allows through the signals between 5 and 65 MHz.

The transposition device 160 comprises a frequency divider 161 which divides the frequency of the reference oscillator 112 by two so as to provide a phase/frequency comparator 162 with a reference signal at 5 MHz having the same accuracy as the reference oscillator 112, i.e. $10^{-5}$. The phase/frequency comparator 162 compares the reference signal with a signal leaving a frequency divider circuit 163 which provides a frequency signal divided by 47 relative to the frequency of an oscillator 164 controlled by the phase difference provided by the said comparator 162, so that the signal provided by the oscillator 164 is at the frequency of 235 MHz. The transposition device 160 also comprises a mixer 165 for multiplying the signal originating from the filter 150 by the signal originating from the oscillator 164. A filter 166 allows through the band lying between 240 and 300 MHz carrying out, in combination with the other means of the transposition device 160, a transposition in infradyne manner.

The transposition device 170 comprises a phase/frequency comparator 171 which receives a reference signal at 10 MHz originating from the reference oscillator 112. The phase/frequency comparator 171 compares the reference signal with a signal leaving a frequency divider circuit 172 which provides a frequency signal divided by 210 relative to the frequency of an oscillator 173 controlled by the phase difference provided by the said comparator 171, so that the signal provided by the oscillator 173 is at the frequency of 2.1 GHz. The transposition device 170 also comprises a mixer 174 for multiplying the signal originating from the filter 166 by the signal originating from the oscillator 173. A filter 175 allows through the band lying between 1.8 and 1.86 GHz carrying out, in combination with the other means of the transposition device 170, a transposition in supradyne manner.

The mixer 151 multiplies the signals originating from the filter 175 by a signal of frequency 40.2 GHz originating from the oscillator 104 by way of the frequency doublers 117 and 119. An amplifier 152 amplifies the signals provided by the mixer 151 which are thereafter filtered by the filter 153 whose passband lies between 42 and 42.06 GHz. The filter 153, in combination with the mixer 151, carries out a frequency transposition in infradyne manner.

In terms of error, the transposition carried out by the transposition device 160 is done with a maximum frequency error of 2.35 kHz. The transposition carried out by the transposition device 170 is done with a maximum frequency error of 21 kHz and the transposition carried out by the mixer 151 is done with a maximum frequency error of between 3 and 8 kHz. The errors are due to the error in frequency of one and the same reference oscillator 112. The use of a transposition in infradyne manner introduces an error in the opposite direction to that introduced by a transposition in supradyne manner since the frequency drift turns out to have an inverse spectrum while originating from one and the same reference oscillator 112. The total sum of the maximum errors lies between 10.65 and 15.65 kHz as a function of the position of the pilot signal, i.e. an error which is always less than $4 \cdot 10^{-7}$.

FIG. 8 represents an exemplary base station ST which comprises a transmitting/receiving element 200 and a processing element 210 which are linked by a cable 202a for the downlink and cable 202b for the uplink. The transmitting/receiving element comprises amplifying means and transposition means for transposing on the one hand the uplink signals and on the other hand the downlink signals including a single oscillator 201 for performing the transposition between the cables 202a and 202b and an antenna 203. It is not necessary for the signals carried by the cables 202a and 202b to be compatible with the DOCSIS standard since here with are dealing with a network head which can communicate by way of several types of media. Thus, the frequency constraints are more flexible and a single transposition is sufficient.

The processing element 210 is placed for example in a sealed box which can be easily accessed by an operator. The box makes it possible to circumvent constraints related to the atmospheric parameters. The processing element comprises filters 213 connected on the one hand to the cable 202a or to the cable 202b, and on the other hand to a module 214 which shapes the down channels from one or more sources (not represented), or to a module 215 receiving the up channels and orienting the data on one or more media (not represented), and also to an oscillator 216 which provides the pilot signal. Each filter 213 is a bandpass filter whose bandwidth permits the transmission solely of the signals of the module 214, 215 or 216 to which it is linked.

The base station being combined with the external unit 1, it may be noted that the constraints in terms of stability of the oscillator 201 are limited to the permitted span of variation of the oscillator 104 (which is 0.1% in the example but which may be greater). On the other hand, the transpositions carried out by the modules 214 and 215 must be synchronized with the oscillator 216 with an accuracy comparable to that of the external unit 1.

The invention has been described in conjunction with a terrestrial transmission device compatible with a cable network. The invention although particularly well suited to this type of use may be used in a general manner in any type of radio transmission requiring high accuracy of transmission, both terrestrial and satellite without necessarily requiring it to be compatible with a cable network.

The invention describes a system including a return link also referred as to as the uplink since it is particularly well suited to this type of application. However, it is entirely possible to use the invention without a return link.

The invention claimed is:

1. External unit placed on the subscriber side of a transmission system using at least one reference subcarrier placed at various locations in a transmission frequency band, the transmission frequency band furthermore comprising at least one data-carrier downlink channel, wherein the external unit comprises:

a reference oscillator for generating a frequency reference signal;

a local oscillator for generating a first transposing signal for transposing the transmission frequency band into a transposed frequency band;

a frequency synthesizer for providing a frequency transposition signal coupled to the reference oscillator;

additional transposition means for mixing and filtering the transposed reference subcarrier with the frequency transposition signal generating an additionally transposed reference subcarrier in a predefined frequency band;

synchronization means for comparing the phase of the additionally transposed reference subcarrier and the frequency signal, carrying out a frequency feedback control signal to synchronize the local oscillator; and a latching device placed between the local oscillator and the synchronization means so that the latching device drives the local oscillator until a transposed image of the reference subcarrier appears in the desired frequency span.

2. Unit according to claim 1, wherein the additional transposition means comprise a very selective filter.

3. Radio frequency transmission system comprising at least one base station and at least one subscriber device, the base station using a single oscillator to perform a downward transposition of signals towards the frequency band transmitted by radio and possibly an upward transposition of signals from the frequency band received by radio, the subscriber device comprising an internal unit and an external unit which are linked by a cable, said external unit placed on the subscriber side of a transmission system operating in a transmission frequency band and in a reception frequency band using at least one reference sub carrier placed at various location in a transmission frequency band, the reception frequency band furthermore comprising at least one data-carrier uplink channel, wherein said external unit comprises:

a reference oscillator for generating a frequency reference signal;

a local oscillator for generating a signal for transposing the transmission frequency band into a transposed frequency band, the transposed frequency band including the transposed reference sub carrier;

a first transposition means for transposing the transmission frequency band into a transposed frequency band, the transposed frequency band including the transposed reference sub carrier;

second transposition means for transposing the received frequency band into the uplink frequency band;

a frequency synthesizer for providing a frequency transposition signal coupled to the reference oscillator;

additional transposition means for mixing and filtering the transposed reference sub carrier with the frequency transposition signal generating an additionally transposed reference sub carrier in a predefined frequency band;

synchronization means for comparing the phase of the additionally transposed reference sub carrier and the frequency reference signal, carrying out a frequency feedback control signal to synchronize the local oscillator; and a latching device placed between the local oscillator and the comparator means.

4. System according to claim 3, wherein said additional transposition means comprise a very selective filter.

5. System according to claim 3, wherein the second transposition means comprise a third and a fourth frequency transposition means, and wherein the third and the fourth transpositions are done in an infradyne manner in the one case and in a supradyne manner in the other case.

6. External unit placed on the subscriber side of a transmission system operating in a transmission frequency band and in a reception frequency band using at least one reference sub carrier placed at various location in a transmission frequency band, the reception frequency band furthermore comprising at least one data-carrier uplink channel, wherein the external unit comprises:

a reference oscillator for generating a frequency reference signal;

a local oscillator for generating a signal for transposing the transmission frequency band into a transposed frequency band, the transposed frequency band including the transposed reference sub carrier;

first transposition means for transposing the transmission frequency band into a transposed frequency band, the transposed frequency band including the transposed reference sub carrier;

second transposing means for transposing the received frequency band into the uplink frequency band;

a frequency synthesizer for providing a frequency transposition signal coupled to the reference oscillator;

additional transposition means for mixing and filtering the transposed reference sub carrier with the frequency transposition signal generating an additionally transposed reference sub carrier in a predefined frequency band;

synchronization means for comparing the phase of the additionally transposed reference sub carrier and the frequency reference signal, carrying out a frequency feedback control signal to synchronize the local oscillator; and a latching device placed between the local oscillator and the synchronization means so that the latching device drives the local oscillator until a transposed image of the reference subcarrier appears in the desired frequency span.

7. Unit according to claim 6, wherein said additional transposition means comprise a very selective filter.

8. Unit according to claim 6, wherein the second transposing means comprise a third and a fourth frequency transposition means, and wherein the third and the fourth transpositions are done in an infradyne manner in the one case and in a supradyne manner in the other case.

* * * * *